(12) United States Patent
Lindberg et al.

(10) Patent No.: US 8,918,741 B2
(45) Date of Patent: Dec. 23, 2014

(54) UNLOCKING A TOUCH SCREEN DEVICE

(71) Applicant: Nokia Corporation, Espoo (FI)

(72) Inventors: Phillip Lindberg, Helsinki (FI); Sami Niemela, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/889,750

(22) Filed: May 8, 2013

(65) Prior Publication Data

US 2013/0246971 A1     Sep. 19, 2013

Related U.S. Application Data

(60) Continuation of application No. 13/357,143, filed on Jan. 24, 2012, which is a division of application No. 11/770,929, filed on Jun. 29, 2007, now Pat. No. 8,127,254.

(51) Int. Cl.
*G06F 3/033* (2013.01)
*G06F 3/0481* (2013.01)
*G06F 3/0486* (2013.01)
*G06F 3/0488* (2013.01)
*H04M 1/677* (2006.01)

(52) U.S. Cl.
CPC .......... *G06F 3/04817* (2013.01); *G06F 3/0486* (2013.01); *G06F 3/04883* (2013.01); *H04M 1/677* (2013.01); *G06F 3/0488* (2013.01); *H04M 2250/22* (2013.01)
USPC ........................................................ 715/863

(58) Field of Classification Search
USPC ................................................ 715/863, 702
See application file for complete search history.

(56) References Cited

U.S. PATENT DOCUMENTS

| | | | |
|---|---|---|---|
| 5,463,725 | A | 10/1995 | Henckel et al. |
| 5,754,306 | A | 5/1998 | Taylor et al. |
| 5,884,185 | A | 3/1999 | Kim |
| 6,055,439 | A | 4/2000 | Helin et al. |
| 6,249,606 | B1 | 6/2001 | Kiraly et al. |
| 6,628,310 | B1 | 9/2003 | Hiura et al. |
| 6,799,061 | B2 | 9/2004 | Jeoung |
| 6,920,619 | B1 | 7/2005 | Milekic |

(Continued)

FOREIGN PATENT DOCUMENTS

| | | |
|---|---|---|
| EP | 1 032 183 A2 | 8/2000 |
| EP | 1 450 248 | 8/2004 |

(Continued)

OTHER PUBLICATIONS

International Search Report and Written Opinion from International Application No. PCT/IB2008/001662 dated Dec. 15, 2009.

(Continued)

*Primary Examiner* — Omar Abdul-Ali
(74) *Attorney, Agent, or Firm* — Alston & Bird LLP

(57) ABSTRACT

A method for unlocking a touch screen device includes providing a touch screen device in an idle mode. An area or region displayed on a screen of the device in the idle mode is contacted or activated to reveal at least one application icon associated with an active/unlocked state of the device. The region is moved, expanded or dragged to an edge of the device to change a state of the device to an active/unlocked mode and activate the revealed application.

20 Claims, 10 Drawing Sheets

(56) References Cited

U.S. PATENT DOCUMENTS

| | | | |
|---|---|---|---|
| 7,487,467 B1 | 2/2009 | Kawahara et al. | |
| 7,509,140 B2 | 3/2009 | Elomaa | |
| 7,593,000 B1 | 9/2009 | Chin | |
| 7,610,599 B1 | 10/2009 | Nashida et al. | |
| 7,676,767 B2 | 3/2010 | Hofmeister et al. | |
| 7,683,888 B1 | 3/2010 | Kennedy | |
| 7,917,861 B2 | 3/2011 | Boettcher et al. | |
| 8,082,523 B2 | 12/2011 | Forstall et al. | |
| 8,127,254 B2 | 2/2012 | Lindberg et al. | |
| 8,130,206 B2 | 3/2012 | Lindroos | |
| 8,209,637 B2 | 6/2012 | Chaudhri et al. | |
| 8,341,557 B2* | 12/2012 | Pisula et al. | 715/863 |
| 8,427,445 B2 | 4/2013 | Kennedy | |
| 8,443,199 B2 | 5/2013 | Kim et al. | |
| 2001/0017934 A1* | 8/2001 | Paloniemi et al. | 382/107 |
| 2003/0090506 A1 | 5/2003 | Moore et al. | |
| 2004/0061788 A1 | 4/2004 | Bateman | |
| 2004/0210845 A1 | 10/2004 | Paul et al. | |
| 2005/0060653 A1 | 3/2005 | Fukase et al. | |
| 2006/0026535 A1 | 2/2006 | Hotelling et al. | |
| 2007/0016958 A1* | 1/2007 | Bodepudi et al. | 726/27 |
| 2007/0067734 A1 | 3/2007 | Cunningham et al. | |
| 2007/0120689 A1* | 5/2007 | Zerhusen et al. | 340/573.1 |
| 2007/0150834 A1 | 6/2007 | Muller et al. | |
| 2007/0150842 A1* | 6/2007 | Chaudhri et al. | 715/863 |
| 2007/0189737 A1 | 8/2007 | Chaudhri et al. | |
| 2007/0250787 A1 | 10/2007 | Kawahara et al. | |
| 2008/0052945 A1 | 3/2008 | Matas et al. | |
| 2008/0184112 A1* | 7/2008 | Chiang et al. | 715/700 |
| 2009/0006991 A1 | 1/2009 | Lindberg et al. | |
| 2009/0007017 A1 | 1/2009 | Anzures et al. | |
| 2009/0064047 A1* | 3/2009 | Shim et al. | 715/835 |
| 2009/0094562 A1 | 4/2009 | Jeong et al. | |
| 2009/0172549 A1 | 7/2009 | Davidson | |
| 2009/0205041 A1* | 8/2009 | Michalske | 726/17 |
| 2009/0249240 A1 | 10/2009 | Lundy et al. | |
| 2009/0264159 A1 | 10/2009 | Hsieh et al. | |
| 2009/0267909 A1 | 10/2009 | Chen et al. | |
| 2009/0289916 A1 | 11/2009 | Dai | |
| 2009/0293007 A1 | 11/2009 | Duarte et al. | |
| 2010/0007613 A1 | 1/2010 | Costa | |
| 2010/0031152 A1 | 2/2010 | Villaron et al. | |
| 2010/0070931 A1* | 3/2010 | Nichols | 715/863 |
| 2010/0081475 A1 | 4/2010 | Chiang et al. | |
| 2010/0088643 A1 | 4/2010 | Ota et al. | |
| 2010/0095206 A1 | 4/2010 | Kim | |
| 2010/0095240 A1 | 4/2010 | Shiplacoff et al. | |
| 2010/0125905 A1 | 5/2010 | Samuels | |
| 2010/0162182 A1 | 6/2010 | Oh et al. | |
| 2010/0205563 A1 | 8/2010 | Haapsaari et al. | |
| 2010/0211872 A1 | 8/2010 | Rolston et al. | |
| 2010/0231533 A1 | 9/2010 | Chaudhri | |
| 2010/0235794 A1 | 9/2010 | Ording | |
| 2010/0248689 A1 | 9/2010 | Teng et al. | |
| 2010/0257490 A1 | 10/2010 | Lyon et al. | |
| 2010/0269040 A1 | 10/2010 | Lee | |
| 2010/0293330 A1 | 11/2010 | Maloney et al. | |
| 2010/0299598 A1 | 11/2010 | Shin et al. | |
| 2010/0306693 A1 | 12/2010 | Brinda | |
| 2010/0306705 A1* | 12/2010 | Nilsson | 715/835 |
| 2011/0105193 A1 | 5/2011 | Lee et al. | |
| 2011/0154196 A1 | 6/2011 | Icho et al. | |
| 2011/0167380 A1 | 7/2011 | Stallings et al. | |
| 2011/0187724 A1 | 8/2011 | Oh et al. | |
| 2011/0209057 A1 | 8/2011 | Hinckley et al. | |
| 2011/0225543 A1 | 9/2011 | Arnold et al. | |
| 2011/0271181 A1 | 11/2011 | Tsai et al. | |
| 2012/0036556 A1 | 2/2012 | LeBeau et al. | |
| 2012/0054680 A1 | 3/2012 | Moonka et al. | |
| 2012/0084738 A1 | 4/2012 | Sirpal | |
| 2012/0098639 A1 | 4/2012 | Ijas | |
| 2012/0124512 A1 | 5/2012 | Lindberg et al. | |
| 2012/0223890 A1 | 9/2012 | Borovsky et al. | |
| 2012/0319984 A1 | 12/2012 | Borovsky et al. | |
| 2013/0147825 A1 | 6/2013 | Martin et al. | |
| 2013/0239045 A1 | 9/2013 | Lindberg et al. | |
| 2013/0239065 A1 | 9/2013 | Lindberg et al. | |

FOREIGN PATENT DOCUMENTS

| | | |
|---|---|---|
| EP | 2 230 623 A1 | 9/2010 |
| EP | 2 256 610 A1 | 12/2010 |
| EP | 2 282 275 A1 | 2/2011 |
| EP | 2 284 646 A1 | 2/2011 |
| GB | 2 310 567 A | 8/1997 |
| JP | 2007-72233 A | 3/2007 |
| WO | WO 00/33570 A1 | 6/2000 |
| WO | WO 2008/116395 A1 | 10/2008 |
| WO | WO 2010/040670 A2 | 4/2010 |
| WO | WO 2011/100623 A2 | 8/2011 |

OTHER PUBLICATIONS

Office Action for Chinese Application No. 2008-800222885 dated Nov. 23, 2011.
Office Action for Korean Application No. 10-2010-7002006 dated Aug. 23, 2011.
International Search Report and Written Opinion for Application No. PCT/FI2011/050776 mailed Dec. 27, 2011.
Office Action for European Application No. EP 08 776 289.4 dated Apr. 26, 2013.
Office Action for U.S. Appl. No. 12/874,206 dated May 23, 2014.
Office Action for U.S. Appl. No. 13/594,238 dated May 28, 2014.
Office Action for U.S. Appl. No. 13/323,132 dated Jun. 9, 2014.
Supplementary European Search Report for Application No. EP 11 82 1164 dated Apr. 2, 2014.
Mixed molo: 5 Best Things About iOS4 [online] [retrieved Jan. 17, 2012]. Retrieved from the Internet: <URL: http://migmol.blogspot.com/2010/06/5-best-things-about-ios4.html>, (dated Jun. 23, 2010) 6 pages.
Shaky Beginnings: Mar. 2010 [online] [retrieved Jan. 17, 2012]. Retrieved from the Internet: <URL: http://rs250-squid.blogspot.com/2010_03_01_archive.html>. (dated Mar. 9, 2010) 5 pages.
"Flex 4.5—Using Mobile View Transitions"; Downloaded from http://devgirl.org/2011/05/12/flex-4-5-using-mobile-view-transitions/ Published on May 12, 2011.
"LauncherPro Plus Home Screen Transition Effects Effects on CyanogenMod 7-RC 2 Motorola Milestone"; Downloaded from http://www.youtube.com/watch?v=bRcMAOLsBP4; Published on Mar. 6, 2011.
"DevTools for .NET"; Downloaded from http://www.telerik.com/community/forums/windows-phone/transition-control/transition-from-page-to-page.aspx; Published on Nov. 16, 2010.
"Interfaces That Flow: Transitions as Design Elements"; Downloaded from http://www.uxmatters.com/mt/archives/2007/04/interfaces-that-flow-transitions-as-design-elements.php; Published on Apr. 26, 2007.
Sprint Personal Communication Services, User Guide, QUALCOMM QCP-2700/2700F Sony CM-B1201SPR (Jul. 1997) 78 pages.
Written Opinion from International Application No. PCT/FI2011/050739, mailed Dec. 16, 2011.
International Search Report from International Application No. PCT/FI2011/050739, mailed Dec. 16, 2011.
International Search Report and Written Opinion for Application No. PCT/FI2012/051220, dated Apr. 25, 2013.
European Search Report for Application No. 13159698 dated Sep. 9, 2013.
Office Action for U.S. Appl. No. 12/874,206 dated Apr. 8, 2013.
Office Action for U.S. Appl. No. 12/874,206 dated Oct. 23, 2013.
Office Action for U.S. Appl. No. 13/323,132 dated Jun. 20, 2013.
Office Action for U.S. Appl. No. 13/323,132 dated Oct. 16, 2013.
Office Action for U.S. Appl. No. 13/323,132 dated Feb. 14, 2014.
Office Action in U.S. Appl. No. 13/594,238 dated Nov. 19, 2012.
Office Action in U.S. Appl. No. 13/594,238 dated May 29, 2013.
Office Action for U.S. Appl. No. 13/323,132 dated Oct. 23, 2014.

* cited by examiner

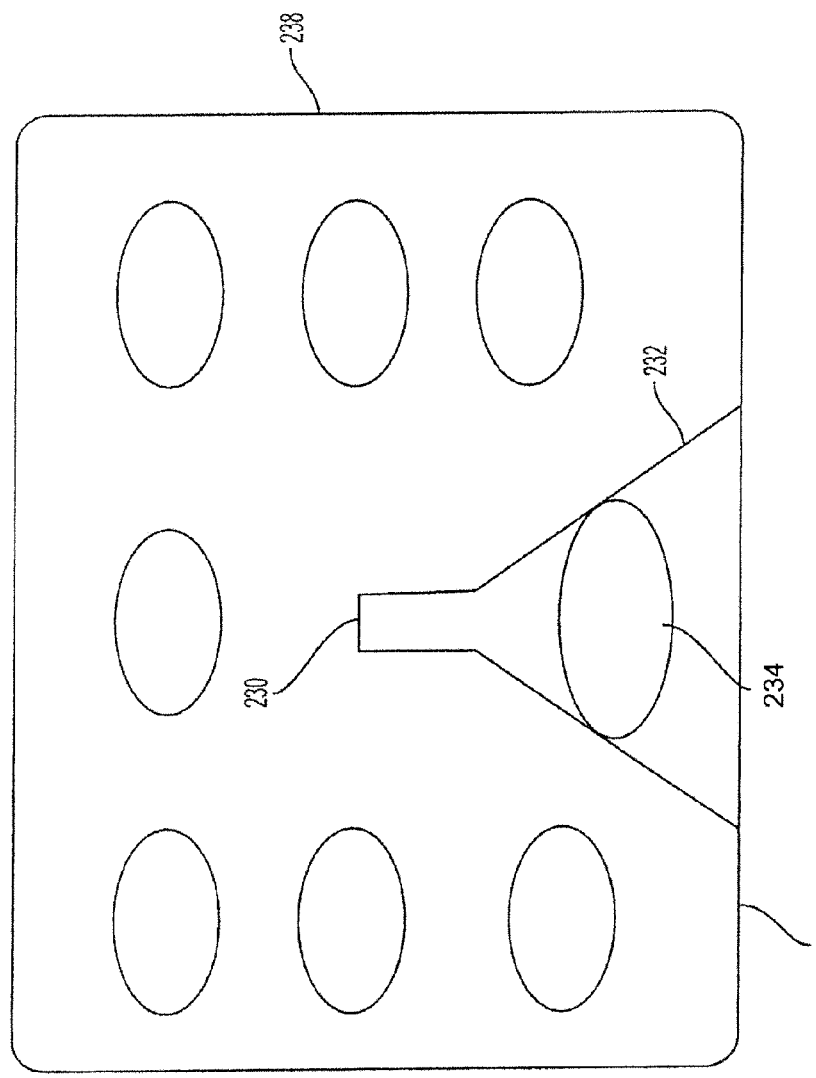

UNLOCKING A TOUCH SCREEN DEVICE

CROSS REFERENCE TO RELATED APPLICATIONS

This application is a continuation of and claims priority to U.S. application Ser. No. 13/357,143, filed on Jan. 24, 2012, which is a divisional of and claims priority to U.S. application Ser. No. 11/770,929, filed on Jun. 29, 2007, the entire contents of which are hereby incorporated by reference.

BACKGROUND

1. Field

The disclosed embodiments generally relate to user interfaces and in particular to transitioning from an idle/locked state of a device to an active/unlocked state of a device.

2. Brief Description of Related Developments

Mobile devices, such as mobile communication devices, generally include a variety of applications, including for example Internet communications, instant messaging capabilities, email facilities, web browsing and searching. In order to avoid the inadvertent activation of the applications of a device, devices generally includes a locked mode, wherein certain information is displayed, however any user inputs to the device will be ignored in the idle state, except to unlock the device. Typically, unlocking a device can require the manipulation of one or more keys of the device, fingerprint sensors, key combinations and number codes, for example. In most cases, when a device is unlocked, the user interface that is presented is pre-determined by the device. Given the variety of applications and application layers that are available is such devices, it would be advantageous to be able to easily unlock a device and move directly into a desired user interface or application.

SUMMARY

In one aspect, the disclosed embodiments are directed to a method. In one embodiment the method includes providing a touch or proximity screen device in an idle mode. A sector or region displayed on a screen of the device in the idle mode is contacted or activated and moved or expanded to reveal at least one application icon associated with an active/unlocked state of the device. The term idle mode generally be referred to as a reduced active region that can be manipulated in limited ways, such as by the unlocking gesture or interaction described herein. As the icon is moved or dragged to an edge of the device, the device changes state to an active/unlocked mode and opens in the application or set of user elements associated with the revealed application icon.

In another aspect, the disclosed embodiments are directed to a user interface. In one embodiment the user interface has at least one region that is non-active in a locked mode of a device and an active region on top or in contrast with the at least one non-active region. The active region is configured to be moved and expanded to reveal the at least one region that is non-active in a locked mode. As the active region is moved towards the edge of a display of the user interface, the state of the device can transition from an idle/locked state to an active/ unlocked state. The user interface opens to a set of user elements corresponding to an application revealed by the expanded active region.

In a further aspect the disclosed embodiments are directed to a computer program product and an apparatus.

BRIEF DESCRIPTION OF THE DRAWINGS

The foregoing aspects and other features of the embodiments are explained in the following description, taken in connection with the accompanying drawings, wherein:

FIGS. 2A-2D are illustrations of exemplary screen shots of the user interface of the disclosed embodiments.

DETAILED DESCRIPTION OF THE EMBODIMENT(S)

Figure 1:
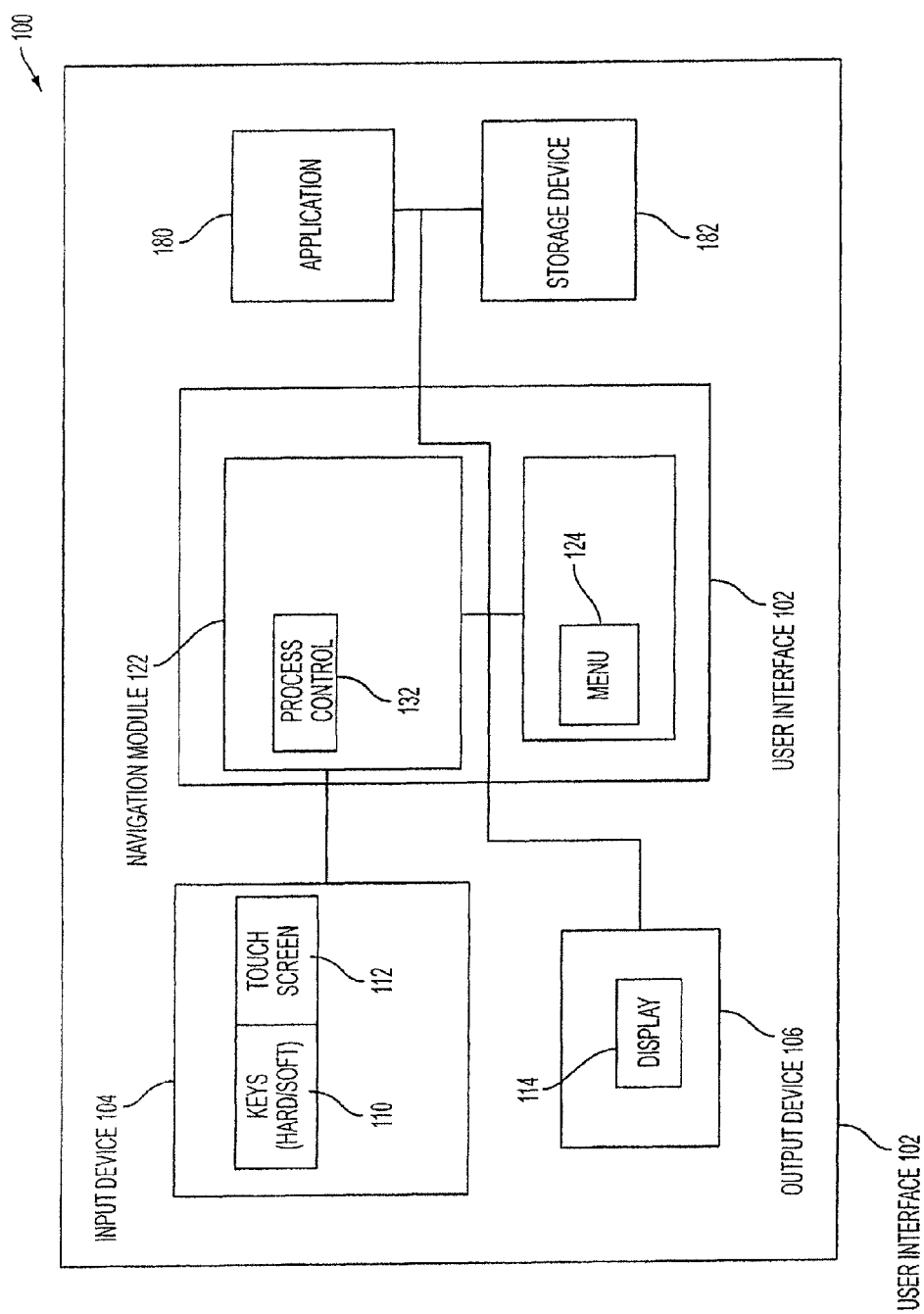
FIG. 1 shows a block diagram of a system in which aspects of the disclosed embodiments may be applied.

Referring to FIG. 1, one embodiment of a system 100 is illustrated that can be used to practice aspects of the claimed invention. Although aspects of the claimed invention will be described with reference to the embodiments shown in the drawings and described below, it should be understood that these aspects could be embodied in many alternate forms of embodiments. In addition, any suitable size, shape or type of elements or materials could be used.

The disclosed embodiments generally allow a user of a device or system, such as the system 100 shown in FIG. 1, to intuitively unlock, or partially unlock or enable, a touch screen device. The system or device 100 can be transitioned from an idle and locked state into an open state by moving or dragging an icon on the screen of the device. When the icon is dragged, the icon can reveal one or more active areas below the icon. The user moves or drags the icon to or near a desired active area and towards or near an unlock region of the display, such as for example, an edge region of the display. In alternate embodiments, any suitable region within the display area can be used as the unlock region. For 4 exemplary purposes, the edge region of the display area will be used herein to describe the unlock region. As the icon reaches the edge, the device unlocks from the idle and locked state into the user interface or application of the revealed active area.

In one embodiment, referring to FIG. 1, the system 100 of FIG. 1 can include an input device 104, output device 106, navigation module 122, applications area 180 and storage/ memory device 182. The components described herein are merely exemplary and are not intended to encompass all components that can be included in a system 100. For example, in one embodiment, the system 100 comprises a mobile communication device or other such Internet and application enabled devices. Thus, in alternate embodiments, the system 100 can include other suitable devices and applications for monitoring application content and activity levels in such a device. While the input device 104 and output device 106 are shown as separate devices, in one embodiment, the input device 104 and output device 106 can be part of, and four, the user interface 102. The user interface 102 can be used to display application and element information to the user, and allow the user to obtain application content and application activity data. In one embodiment, the user interface of the disclosed embodiments can be implemented on or in a device that includes a touch screen display or a proximity screen device. In alternate embodiments, the aspects of the user interface disclosed herein can be embodied on any suitable device that will display information and allow the selection and activation of applications. The terms "select", "move", "drag" "contact" and "touch" are generally described herein with respect to a touch-screen display. However, in alternate embodiments, the terms are intended to encompass the required user action with respect to other input devices. For example, with respect to a proximity screen device, it is not necessary for the user to make direct contact in order to select, move or drag and object or other information. Thus, the above-noted terms are intended to encompass that a user only needs to be within the proximity of the device to carry out the desired function. For example, the term "contact" when used in the context of a proximity screen device, does not imply direct contact, but rather near or close contact, that activates the proximity device.

Similarly, the scope of the intended devices is not limited to single touch or contact devices. Multi-touch devices, where contact by one or more fingers or other pointing devices can navigate on and about the screen.

Figure 2A:
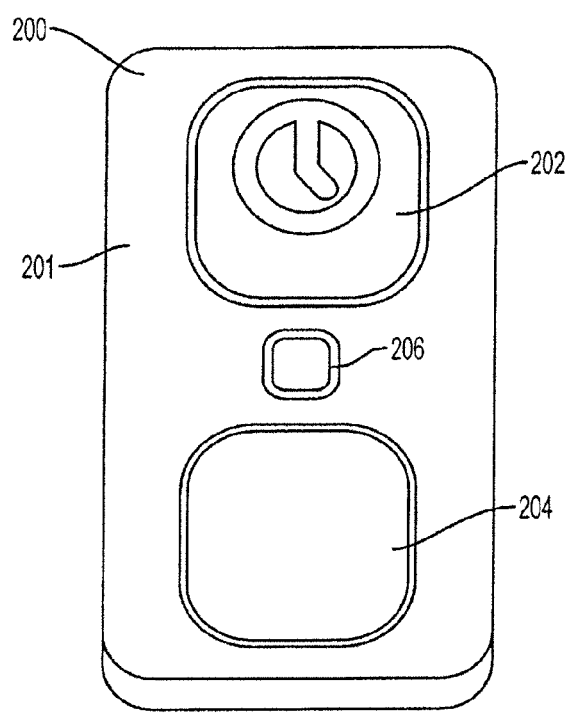

FIG. 2A illustrates one embodiment of a screen shot of a user interface 201 incorporating features of the disclosed embodiments. The screen or user interface 200 of FIG. 2A illustrates a locked or idle mode of the device 100 of FIG. 1. In this example, there are two icons 202 and 204 that appear in a relatively dimmed or less highlighted mode. The icons 202 and 204 each represent an application that is present or available in the device 100. In alternate embodiments, any number of icons can be displayed in a dimmed state, when the device 100 is in the locked or idle mode. In one embodiment, different application areas might have different degrees of "dimness" or shading. For example, the most or more used applications might appear brighter, or less dimmed or shaded, than less used applications. In alternate embodiments, any suitable mechanism can be used to provide variation and different degrees of highlighting to different application areas, based on different rules.

For example, different types of applications might be represented by different colors or shapes. In one embodiment, if the user holds a finger over or touches an application area 202, 204, a frame 203 around the application area could appear in a color, pattern or shape that is representative of a type of application. For example, a message application could be one color, while a settings application is a different color. This can provide the advantage that the user can visualize the area that is being selected. Thus, if for example, the areas are close to one another, the user can conveniently see which area is selected.

Although the application areas 202 and 204 are described as being in a "dimmed" mode, in alternate embodiments, the applications that are not activatable in a locked or idle mode can be represented, highlighted or deemphasized in any suitable fashion. For example, a line or other image might be shown crossing the icons 202 and 204. The user should be aware when looking at the display that the applications are available in the device, but in a locked state and would be accessible if the device was in an unlocked or active state.

In one embodiment, the illumination or highlighting of application areas 202, 204 could have several different degrees, dependent upon how "active" the particular application area is. For example, when the screen 201 is in a locked or inactive state, the illumination or highlighting can be reduced or dimmed by 70% (a 30% illumination level), from a standard mode setting. An application that does not become active, or fully active, when selected, such as a clock that can be temporarily illuminated, may be displayed with a 60% illumination level. For an application that can become fully active, the illumination level might be 90% (dimmed 10%) from the normal levels. In alternate embodiments, any suitable illumination or dimming setting can be used.

Referring to FIG. 2A, in one embodiment, an unlocking icon or object 206 is provided. The icon 206 generally comprises a movable object that can be used to select and highlight different regions or areas on the screens. Although the icon 206 is shown in the shape of a square, in alternate embodiments, any suitable shape or image can be used. In one embodiment, the icon 206 can be highlighted in a contrasting fashion relative to the remainder of the display 200 and icons 202, 204. The icon 206 should be easily identifiable for its function when the device 100 is in the idle and locked mode. In one embodiment, the icon 206 can at least initially be located in a central location on the display 200, such as shown in FIG. 2A. In alternate embodiments, the icon 206 might move about the screen, in the idle and locked mode, such as would a screen saver.

The icon 206 shown in FIG. 2A is selectable and active in the idle/locked mode of the device. In one embodiment, in order to transition the state of the device 100 from the idle/locked mode to the active/unlocked mode, the icon 206 is contacted and dragged towards an edge of the display 200. The dragging of the icon 206 can be carried out in any suitable fashion, such as for example by touching the icon with a finger and moving the finger toward an edge. In alternate embodiments, any suitable pointing device might be used. Similarly, in a proximity screen device, the about actions can be carried out without direct contact.

The unlocking of the device from the nonactive to active mode may also require an additional confirmation step. In one embodiment, after the user has moved the icon 206 to the unlocking region, and additional act(s) may be required by the user to change the state of the device. For example, the icon 206 is moved to the unlock region. The user releases the icon 206 and carries out another action to confirm the unlock. In one embodiment, this other action might be a tap on the icon 206, or a long press of the icon 206. In an alternate embodiment, a secondary key on the device might be enabled as an "unlock" key, and be required to be selected to confirm the unlock request.

While the unlocking of the device is described herein with respect to the use of the icon 206, in alternate embodiments, any suitable mechanism can be used to unlock the device or transition the device, or the applications of the device, from the non-active to active mode. In one embodiment, thus user can paint, draw or trace, for example, a specific pattern on the screen of the device, which is recognized as an unlock command. The pattern might include any suitable image, movement or text, for example. In this embodiment, all of the applications can be made active and available when the pattern is recognized.

In one embodiment, the icon 206 might also be configured for and used to generate a new set of available applications for the device. For example, when the icon 206 is in a certain position, such as the center of the screen, a press for a pre-determined duration could cause a new set of available applications to be displayed. This can be advantageous in devices that have limited screen area and cannot display all available applications simultaneously. By selecting the icon 206 in a certain fashion, for a pre-determined period of time, different application layers can be displayed at different times. In alternate embodiments, different layers of applications can be accessed in any suitable manner. For example, the user could access layer A by moving a finger, or the icon 206, to a top left corner of the screen 200. Layer B could be accessed my moving a finger or icon 206 to a top right corner. Each corner of the screen area, or other suitable region, could represent a different layer.

Figure 2B:
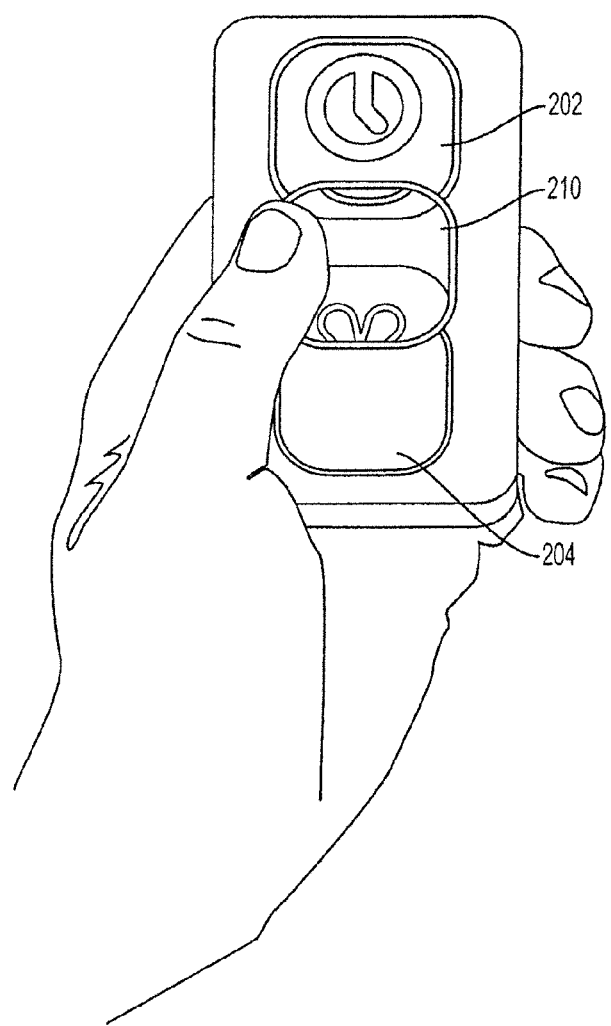

In one embodiment, referring to FIG. 2B, when the icon 206 is contacted or touched, the icon 206 can be highlighted in some fashion to indicate that it has been selected. For example, when the background area 201 of the display 200 is a dark color or tone in the idle/locked mode, the icon 206 can be highlighted in a contrasting color or tone, such as white. This allows the icons 202 and 204 to be easily visible underneath the icon 206, as shown for example in FIG. 2B. In alternate embodiments, the contacting of the icon 206 could be recognized by any suitable visual feedback, and may also include audible or tactile feedback.

As shown in FIG. 2B, in one embodiment, when the icon 206 of FIG. 2A is selected, the icon can expand in size, as shown by icon 210. The icon 210 can expand, dilate or open up to reveal the user interface and icons 202, 204 of an active idle state. Although items 202 and 204 are described as icons, in alternate embodiments these could also be text or an object other than an icon. The icon 210 can generally be configured to track the movement of the user's finger in proximity to or contacting the icon and open accordingly to reveal a larger active area below, and perhaps a different set of user interface elements. In one embodiment, is the user presses or holds the finger in a pre-determined position for a certain period of time, the icon can open to reveal the active area below. The longer the user holds the finger in the same position, the larger the active area size becomes. This allows for easier access to the applications as well as making it easier to visualize the different application symbols in the active area. As shown in FIG. 2B, if the user moves or expands the icon 210 towards the top of the display, the icon 202 can be more visible. If the icon is moved or expanded towards the bottom of the display, the icon 204 becomes more visible. In alternate embodiments where there are more icons related to an active idle state, those icons would become visible as the icon 210 is moved or expanded in that direction. For example, the icons 202, 204 could be suitably sized in order to allow for more such icons to appear on the display. Such icons might appear to the left/right, up/down, in diagonal directions extending from the center region of the display or in a circle at a distance from the center of the display. As the icon 210 is moved or expanded in any of these directions or orientations, the icons would become visible to the user, relative to their dimmed state in the idle/locked mode of the device. The icon can expanded to any suitable size and direction, and can be dragged into or across one or more areas or regions. The middle square region 206 (reduced active area) expands in all directions towards the extent of the display area (edge) relative to a common centre point (middle of the display area). This is synonymous with the action of "dilation".

Each area or region on the display of the device 200 in the idle/locked mode can have a different purpose and display a different set of user interface elements, which remain inactive and in the locked mode as the icon 210 is moved over them. The expansion and/or dilation of the icon 206 can be suitable configured to encompass one region at a time, if so desired. Alternatively, the icon 206 can be configured to encompass any suitable number or regions on the display 200.

The icon 206 does not have to encompass the entirety of an application area 202, 204 in order for the application area to be selected. In one embodiment, once a pre-determined percentage of the displayed object 202, 204 area is encompassed by the icon 206, the displayed object is selected. This percentage can be any desired percentage. This can be recognized by some highlighting of the object, such as for example, a frame around the object. The recognition could also be in the form of some visual, audio or tactile mechanism.

In one embodiment, the user drags or moves the icon 206 to the unlock region of the display to unlock the device from the inactive state and illuminate all applications in the active area. Once all the applications are illuminated, the user can move or drag the icon 206, or the user's finger to or near the desired application(s). In one embodiment, the user may have to confirm the selection in order to open the application.

In one embodiment, the shape of the icon 206 can be suitably configured relative to the number of icons, such as 202 and 204, present on the display 200. As shown in FIG. 2B, the shape of the icon 210 is substantially a square. In alternate embodiments, any suitable geometric shape can be used, including for example, a rectangle, circle, triangle or cone. In one embodiment, the shapes of the icon 210 as it expands may be as a point in the center region of the display 200, and extend and expand outwards towards the desired edge of the display 200. The width of the icon 210 can expand to encompass and reveal applications and elements in the path of the movement of the icon 210. An example of this is shown with respect to FIG. 2D. Here the shape or area of the icon 230 expands outwards in the shape of a cone from an origin, similar to the beam of a light from a flashlight, 232 as it is moved and dragged. The area of the cone 232 reveals application 234 and as it reaches the edge 236 of the display area 238, the device unlocks and opens the application 234. Here again, in one embodiment, the user may be required to confirm the unlocking operation with another act.

Figure 2C:
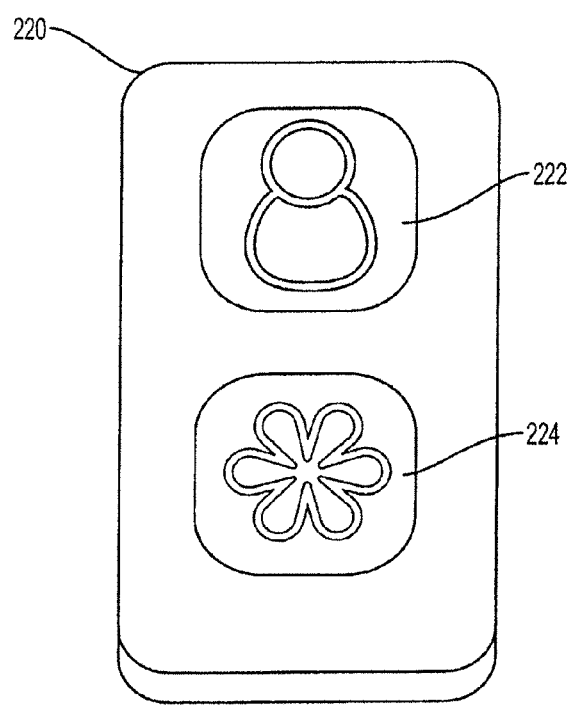

When the user has moved or expanded a size of the icon 210 to encompass a desired area and set of user interface elements or applications, the user can select to unlock the device. This could include reaching an unlocking area, such as an edge of the display area, a long press on the screen, a double click or tap, or a hold and release for a pre-determined time period. In alternate embodiments, any suitable mechanism can be used to unlock the device from the inactive state after a region is highlighted or selected. When the device unlocks and transitions state to an active mode, the user interface elements 222, 224 associated with the selected icon, in this example icon 204, are displayed, as shown in FIG. 2C. The display 220 in FIG. 2C can be referred to an active idle mode or state. In one embodiment, the active idle mode refers to an idle screen on the device. The idle screen can present images, icons, text and objects, for example, that when selected and/or activated, provide direct access or short cuts to certain programs and applications associated with the idle state of the device. In this example, the icon 204 of FIG. 2A, representing a communication application, opens to user interface elements for contacts 222 and applications 224. This provides the user with the advantage of determining, prior to unlocking a device from an inactive state, an application or set of user interface elements for the device to open up to. The user selects which screen to go to directly after unlocking the device.

Figure 3:
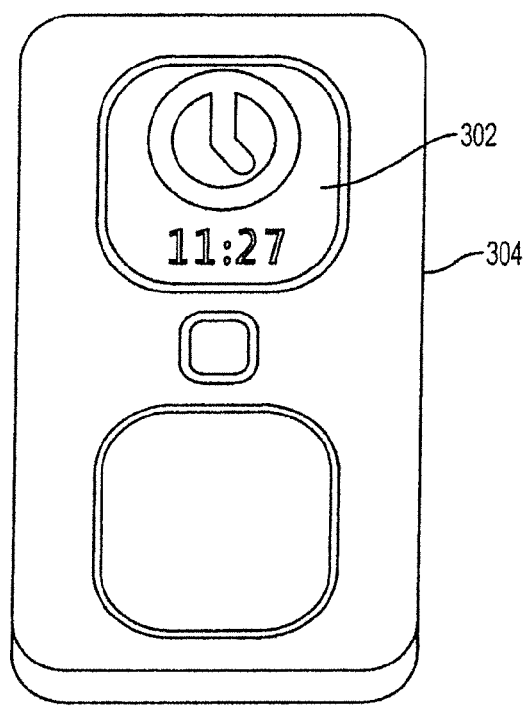
FIG. 3 is an illustration of an exemplary screen shot of one aspect of the user interface of the disclosed embodiments.

Referring to FIGS. 2A and 3, in one embodiment, the user can select or contact the dimmed icons 202 and 204 to determine a state, utility or function of the underlying application, without the need to unlock the device or open the application. For example, in FIG. 2A, dimmed icon 202 represents a time or clock application. In the dimmed mode, when the device is locked, it may not be possible to view any functions of the application, such as for example, the current time. However, the features of the disclosed embodiments allow the icon 202 to be contacted to temporarily illuminate or somehow highlight the icon, as illustrated by icon 302 in FIG. 3. This state, which might be described as a passive active state, allow for temporary activation of an application, such as a clock. This is also referred to herein as the "semi-active" state. As shown in FIG. 3, the clock application icon 302 is illuminated when that area is selected, and the current time is available and can be viewed, particularly against the dimmed and/or darkened background 304. In alternate embodiments, any suitable way to temporarily highlight the selected icon can be implemented. The clock function is illuminated temporarily, but does not become fully active. The icon 302 can remain illuminated for a pre-determined period of time, such as for example, 5 seconds. This allows the quick activation of high level user interface elements for passive information gathering, while the device remains in the idle and locked mode.

In one embodiment, it is possible to lock the device, or change a state of the device from active to inactive, in a manner similar to the process used to change state from inactive to active. For example, while in the active state, the user can select and move the icon 210 to a locking region of the display. For exemplary purposes, this region will be described as an edge region of the display. Once the device is in the active mode, the areas that were described as "unlocking" regions might now become the "locking" regions. Once the icon is moved to the locking region, the device can change state.

In one embodiment, when the icon 210 is moved to a locking region, confirmation from the user can be required before the device changes state. In one embodiment, this might be a tapping on the icon 210, a long press or contact or other action. For example, the user drags the icon 206 to the lock region. The user could tap the icon 206 and then release. A tap on another application area, such as area 202 could confirm the lock mode. In one embodiment, the user drags the icon 206 to the lock region, and once the icon 206 is in that region, a lock function becomes enabled on a key of the device. Pressing that key will cause the device to lock and enter the inactive mode. Alternatively, forming a pattern or image on the screen, as described previously, can cause the device to change states.

The aspects of the disclosed embodiments can be implemented on any device that includes a user interface for the display and accessing of information, such as the system 100 shown in FIG. 1. In one embodiment, the input device 104 includes a touch screen display 112 on which the icons 202, 204, 206 and others can be displayed. The inputs and commands from a user, such as the touching of the screen, are received in the input module 104 and passed to the navigation module 122 for processing. The navigation module 122 can determine and set the state of the device. The output device 106, which in one embodiment is implemented in the touch screen display 112, can receive data from the user interface 102, application 180 and storage device 182 for output to the user. Examples of such devices include wireless and wired devices, mobile communication devices, Internet tablets, and touch pads.

Each of the input device 104 and output device 106 are configured to receive data or signals in any format, configure the data or signals to a format compatible with the application or device 100, and then output the configured data or signals. While a display 114 is shown as part of the output device 106, in other embodiments, the output device 106 could also include other components and device that transmit or present information to a user, including for example audio devices and tactile devices.

The user input device 104 can include controls that allow the user to interact with and input information and commands to the device 100. For example, with respect to the embodiments described herein, the user interface 102 can comprise a touch screen display. The output device 106 can be configured to provide the content of the exemplary screen shots shown herein, which are presented to the user via the functionality of the display 114. Where a touch screen device is used, the displays 112 and 114 can comprise the same or parts of the same display. User inputs to the touch screen display are processed by, for example, the touch screen input control 112 of the input device 104. The input device 104 can also be configured to process new content and communications to the system 100. The navigation module 122 can provide controls and menu selections, and process commands and requests. Application and content objects can be provided by the menu control system 124. The process control system 132 can receive and interpret commands and other inputs, interface with the application module 180, storage device 180 and serve content as required. Thus, the user interface 102 of the embodiments described herein, can include aspects of the input device 104 and output device 106.

Figure 4A:
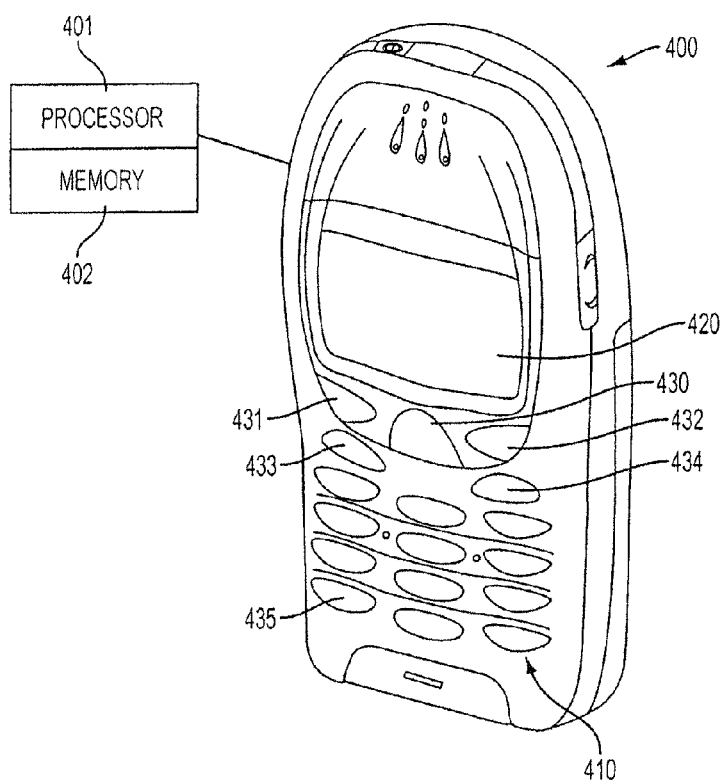
FIGS. 4A-4B are illustrations of examples of devices that can be used to practice aspects of the disclosed embodiments.
Figure 4B:
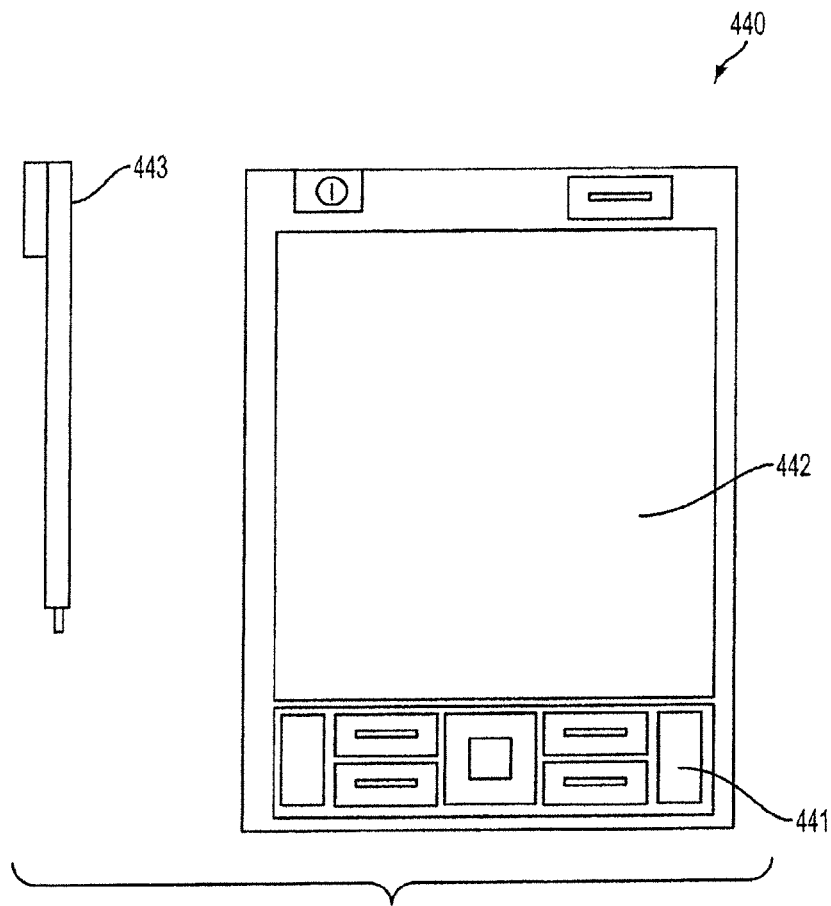

Examples of devices on which aspects of the disclosed embodiments can be practiced are illustrated with respect to FIGS. 4A and 4B. The terminal or mobile communications device 400 may have a keypad 410 and a display 420. The keypad 410 may include any suitable user input devices such as, for example, a multi-function/scroll key 430, soft keys 431, 432, a call key 433, an end call key 434 and alphanumeric keys 435. The display 420 may be any suitable display, such as for example, a touch screen display or graphical user interface. The display may be integral to the device 400 or the display may be a peripheral display connected to the device 400. A pointing device, such as for example, a stylus, pen or simply the user's finger may be used with the display 420. In alternate embodiments any suitable pointing device may be used. In other alternate embodiments, the display may be a conventional display. The device 400 may also include other suitable features such as, for example, a camera, loud speaker, connectivity port or tactile feedback features. The mobile communications device may have a processor 401 connected to the display for processing user inputs and displaying information on the display 420. A memory 402 may be connected to the processor 401 for storing any suitable information and/or applications associated with the mobile communications device 400 such as phone book entries, calendar entries, etc.

Figure 6:
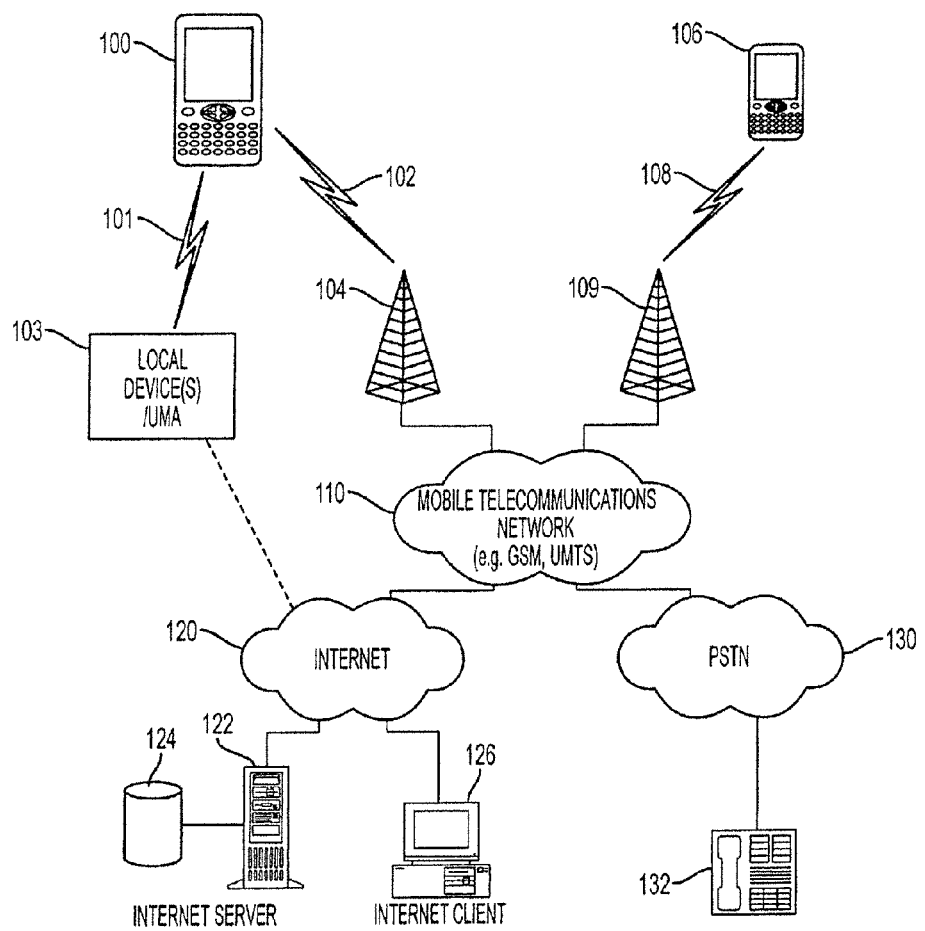
FIG. 6 is a block diagram illustrating one embodiment of a general architecture of the exemplary local system of FIGS. 4A-4B

In the embodiment where the device 400 comprises a mobile communications device, the device can be adapted to communication in a telecommunication system, such as that shown in FIG. 6. In such a system, various telecommunications services such as cellular voice calls, www/wap browsing, cellular video calls, data calls, facsimile transmissions, music transmissions, still image transmission, video transmissions, electronic message transmissions and electronic commerce may be performed between the mobile terminal 600 and other devices, such as another mobile terminal 606, a line telephone 632, a personal computer 651 or an Internet server 622. It is to be noted that for different embodiments of the mobile terminal 600 and in different situations, some of the telecommunications services indicated above may or may not be available. The aspects of the disclosed embodiments are not limited to any particular set of services in this respect.

The mobile terminals 600, 606 may be connected to a mobile telecommunications network 610 through radio frequency (RF) links 602, 608 via base stations 604, 609. The mobile telecommunications network 610 may be in compliance with any commercially available mobile telecommunications standard such as for example GSM, UMTS, D-AMPS, CDMA2000, (W)CDMA, WLAN, FOMA and TD-SCDMA.

The mobile telecommunications network 610 may be operatively connected to a wide area network 620, which may be the internet or a part thereof. An internet server 622 has data storage 624 and is connected to the wide area network 620, as is an Internet client computer 626. The server 622 may host a www/wap server capable of serving www/wap content to the mobile terminal 600.

A public switched telephone network (PSTN) 630 may be connected to the mobile telecommunications network 610 in a familiar manner. Various telephone terminals, including the stationary telephone 632, may be connected to the PSTN 630.

The mobile terminal 600 is also capable of communicating locally via a local link 601 or 651 to one or more local devices 603 or 650. The local links 601 or 651 may be any suitable type of link with a limited range, such as for example Bluetooth, a Universal Serial Bus (USB) link, a wireless Universal Serial Bus (WUSB) link, an IEEE 802.11 wireless local area network (WLAN) link, an RS-232 serial link, etc. The local devices 603 can, for example, be various sensors that can communicate measurement values to the mobile terminal 600 over the local link 601. The above examples are not intended to be limiting, and any suitable type of link may be utilized. The local devices 603 may be antennas and supporting equipment forming a WLAN implementing Worldwide Interoperability for Microwave Access (WiMAX, IEEE 802.16), WiFi (IEEE 802.11x) or other communication protocols. The WLAN may be connected to the interne. The mobile terminal 600 may thus have multi-radio capability for connecting wirelessly using mobile communications network 610, WLAN or both. Communication with the mobile telecommunications network 610 may also be implemented using WiFi, WiMax, or any other suitable protocols, and such communication may utilize unlicensed portions of the radio spectrum (e.g. unlicensed mobile access (UMA)). In one embodiment, the navigation module 122 of FIG. 1 includes a communication module that is configured to interact with the system described with respect to FIG. 6.

In one embodiment, the system 100 of FIG. 1 may be for example, a PDA style device 440 illustrated in FIG. 4B. The PDA 440 may have a keypad 441, a touch screen display 442 and a pointing device 443 for use on the touch screen display 442. In still other alternate embodiments, the device may be a personal communicator, a tablet computer, a laptop or desktop computer, a television or television set top box, or any other suitable device capable of containing the display 442 and supported electronics such as a processor and memory. The exemplary embodiments herein will be described with reference to the mobile communications device 400 for exemplary purposes only and it should be understood that the embodiments could be applied equally to any suitable device incorporating a display, processor, memory and supporting software or hardware.

The user interface 102 of FIG. 1 can also include a menu system 124 in the navigation module 122. The navigation module 122 provides for the control of certain states, processes and utilities of the device 100. The menu system 124 can provide for the selection of different tools and application options related to the applications or programs running on the device 100. In the embodiments disclosed herein, the navigation module 122 receives certain inputs, such as for example, signals, transmissions, instructions or commands related to the functions of the device 100. Depending on the inputs, the navigation module interprets the commands and directs the process control 132 to execute the commands accordingly.

Activating a control generally includes any suitable manner of selecting or activating a function associated with the device, including touching, pressing or moving the input device. In one embodiment, where the input device 104 comprises control 110, which in one embodiment can comprise a device having a keypad, pressing a key can activate a function. Alternatively, where the control 110 of input device 104 also includes a multifunction rocker style switch, the switch can be used to select a menu item and/or select or activate a function. When the input device 104 includes control 112, which in one embodiment can comprise a touch screen pad, user contact with the touch screen will provide the necessary input. Voice commands and other touch sensitive input devices can also be used.

Although the above embodiments are described as being implemented on and with a mobile communication device, it will be understood that the disclosed embodiments can be practiced on any suitable device. For example, the device 100 of FIG. 1 can generally comprise any suitable electronic device, such as for example a personal computer, a personal digital assistant (PDA), a mobile terminal, a mobile communication terminal in the form of a cellular/mobile phone, or a multimedia device or computer. In alternate embodiments, the device 100 of FIG. 1 may be a personal communicator, a mobile phone, a tablet computer, a laptop or desktop computer, a television or television set top box a DVD or High Definition player or any other suitable device capable of containing for example a display 114 shown in FIG. 1, and supported electronics such as the processor 401 and memory 402 of FIG. 4. For description purposes, the embodiments described herein will be with reference to a mobile communications device for exemplary purposes only and it should be understood that the embodiments could be applied equally to any suitable device incorporating a display, processor, memory and supporting software or hardware.

Referring to FIG. 1, the display 114 of the device 100 can comprise any suitable display, such as noted earlier, a touch screen display or graphical user interface. In one embodiment, the display 114 can be integral to the device 100. In alternate embodiments the display may be a peripheral display connected or coupled to the device 100. A pointing device, such as for example, a stylus, pen or simply the user's finger may be used with the display 114. In alternate embodiments any suitable pointing device may be used. In other alternate embodiments, the display may be any suitable display, such as for example a flat display 114 that is typically made of an LCD with optional back lighting, such as a TFT matrix capable of displaying color images. A touch screen may be used instead of a conventional LCD display.

The device 100 may also include other suitable features such as, for example, a camera, loudspeaker, connectivity port or tactile feedback features.

Figure 5:
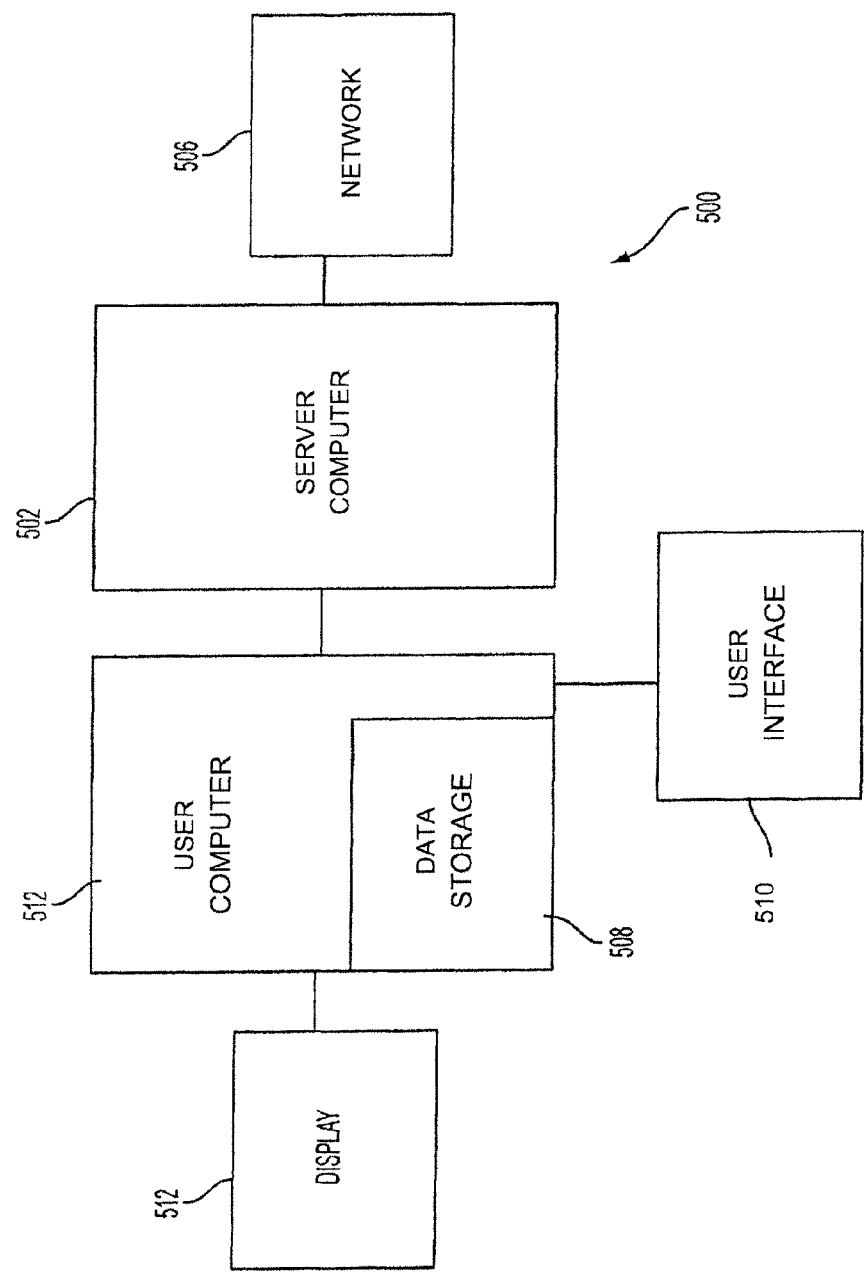
FIG. 5 illustrates a block diagram of an exemplary apparatus incorporating features that may be used to practice aspects of the disclosed embodiments.

The disclosed embodiments may also include software and computer programs incorporating the process steps and instructions described above that are executed in different computers. FIG. 5 is a block diagram of one embodiment of a typical apparatus 500 incorporating features that may be used to practice aspects of the invention. The apparatus 500 can include computer readable program code means for carrying out and executing the process steps described herein. As shown, a computer system 502 may be linked to another computer system 504, such that the computers 502 and 504 are capable of sending information to each other and receiving information from each other. In one embodiment, computer system 502 could include a server computer adapted to communicate with a network 506. Computer systems 502 and 504 can be linked together in any conventional manner including, for example, a modem, wireless, hard wire connection, or fiber optic link. Generally, information can be made available to both computer systems 502 and 504 using a communication protocol typically sent over a communication channel or through a dial-up connection on ISDN line. Computers 502 and 504 are generally adapted to utilize program storage devices, such as memory, embodying machine-readable program source code, which is adapted to cause the computers 502 and 504 to perform the method steps, disclosed herein. The program storage devices incorporating aspects of the invention may be devised, made and used as a component of a machine utilizing optics, magnetic properties and/or electronics to perform the procedures and methods disclosed herein. In alternate embodiments, the program storage devices may include magnetic media such as a diskette or computer hard drive, which is readable and executable by a computer. In other alternate embodiments, the program storage devices could include optical disks, read-only-memory ("ROM") floppy disks and semiconductor materials and chips.

Computer systems 502 and 504 may also include a microprocessor for executing stored programs. Computer 502 may include a data storage device 508 on its program storage device for the storage of information and data. The computer program or software incorporating the processes and method steps incorporating aspects of the invention may be stored in one or more computers 502 and 504 on an otherwise conventional program storage device. In one embodiment, computers 502 and 804 may include a user interface 510, and a display interface 512 from which aspects of the invention can be accessed. The user interface 510 and the display interface 512 can be adapted to allow the input of queries and commands to the system, as well as present the results of the commands and queries.

The disclosed embodiments generally provide for a user to select an application or set of user interface elements that a device will open to from an idle and locked mode. A small icon can be dragged toward an edge of a display of the device to initiate the unlocking process. As the icon is moved or dragged, the icon can expand to reveal one or more active areas below the icon, or below the path that the icon travels. The user can move the icon about the screen to find a desired application or active areas for the device to open up to or into. When the user moves the icon to substantially at or near an edge of the display of the device, device can transition from the idle/locked mode to the active/unlocked mode. The disclosed embodiments thus provide an intuitive way and physical method to unlock a touch screen device.

It should be understood that the foregoing description is only illustrative of the embodiments. Various alternatives and modifications can be devised by those skilled in the art without departing from the embodiments. Accordingly, the disclosed embodiments are intended to embrace all such alternatives, modifications and variances that fall within the scope of the appended claims.

The invention claimed is:

1. An apparatus, comprising:
   at least one processor; and
   at least one memory storing computer program code configured, working with the at least one processor, to cause at least the following to be performed:
   causing a display of a device to display an object, relating to an application, when the device is in a locked mode; and
   enabling a user to select the object while the device is in the locked mode, in order to determine a state, function or utility of the application without fully activating the application while the device remains in the locked mode.

2. The apparatus as claimed in claim 1, wherein the computer program code is configured, working with the at least one processor, to cause at least the following to be performed: responding to user selection of the object by illuminating or highlighting the object.

3. The apparatus as claimed in claim 2, wherein a movable object is provided to enable the user to select the object.

4. The apparatus as claimed in claim 2, wherein the object is highlighted or illuminated to a lesser extent than that associated with a standard mode setting.

5. The apparatus as claimed in claim 1, wherein the object represents an application that is present or available in the device.

6. The apparatus as claimed in claim 1, wherein the computer program code is configured, working with the at least one processor, to cause at least the following to be performed: causing the display to display another object, relating to another application, when the device is in a locked mode.

7. The apparatus as claimed in claim 6, wherein the another object represents an application that is present or available in the device.

8. The apparatus as claimed in claim 6, wherein the another object indicates that the another application is not activatable when the device is in the locked mode.

9. The apparatus as claimed in claim 1, wherein the display is a touch screen display, and enabling a user to select the object comprises enabling the user to select the object using the touch screen display.

10. The apparatus as claimed in claim 1, wherein the apparatus is the device.

11. A method, comprising:
    causing a display of a device to display an object, relating to an application, when the device is in a locked mode; and
    enabling a user to select the object while the device is in the locked mode, in order to determine a state, function or utility of the application without fully activating the application while the device remains in the locked mode.

12. The method as claimed in claim 11, wherein the object is a dimmed icon.

13. The method as claimed in claim 11, further comprising: responding to user selection of the object by illuminating or highlighting the object.

14. The method as claimed in claim 11, wherein a movable object is provided to enable the user to select the object.

15. The method as claimed in claim 11, wherein the object represents an application that is present or available in the device.

16. The method as claimed in claim 11, wherein the display is a touch screen display, and enabling a user to select the object comprises enabling the user to select the object using the touch screen display.

17. A non-transitory computer readable medium storing computer program code that, when performed by at least one processor, causes at least the following to be performed:
    causing a display of a device to display an object, relating to an application, when the device is in a locked mode; and
    enabling a user to select the object while the device is in the locked mode, in order to determine a state, function or utility of the application without fully activating the application while the device remains in the locked mode.

18. The non-transitory computer readable medium as claimed in claim 17, wherein the object is a dimmed icon.

19. The apparatus as claimed in claim 17, wherein the object is an icon.

20. The apparatus as claimed in claim 19, wherein the icon is a dimmed icon.

* * * * *